(12) United States Patent
Abdelnur

(10) Patent No.: US 6,636,900 B2
(45) Date of Patent: Oct. 21, 2003

(54) METHOD AND APPARATUS FOR EXECUTING DISTRIBUTED OBJECTS OVER A NETWORK

(75) Inventor: Alejandro H. Abdelnur, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 68 days.

(21) Appl. No.: 09/106,209

(22) Filed: Jun. 29, 1998

(65) Prior Publication Data

US 2002/0083208 A1 Jun. 27, 2002

(51) Int. Cl.[7] .................................................. G06F 9/00
(52) U.S. Cl. ........................................ 709/316; 709/203
(58) Field of Search ................................. 709/201, 203, 709/219, 227, 315, 316; 707/2, 107; 345/346

(56) References Cited

U.S. PATENT DOCUMENTS

| 5,761,507 | A | * | 6/1998 | Govett | 709/101 |
|---|---|---|---|---|---|
| 5,822,585 | A | * | 10/1998 | Noble et al. | 709/202 |
| 6,076,092 | A | * | 6/2000 | Goldberg et al. | 707/103 |
| 6,173,290 | B1 | * | 1/2001 | Goldberg | 707/103 |
| 6,178,440 | B1 | * | 1/2001 | Foster et al. | 709/201 |
| 6,185,609 | B1 | * | 2/2001 | Rangarajan et al. | 709/219 |
| 6,223,217 | B1 | * | 4/2001 | Pettus | 709/203 |

\* cited by examiner

*Primary Examiner*—St. John Courtenay, III
*Assistant Examiner*—V. H. Nguyen
(74) *Attorney, Agent, or Firm*—Finnegan, Henderson, Farabow, Garrett & Dunner, L.L.P.

(57) ABSTRACT

A method and apparatus for developing, distributing, and executing workers (e.g., objects) of an application in a client computer and over a network of computers in a manner that is hidden to a user or programmer. The workers may be distributed to any computer (e.g., server computer) in the network and can be located by a requesting computer (e.g., client computer). The distributed workers may be executed locally or remotely to produce an output value for use in a requesting computer application. Interprocess communications between the requesting computer and other network computers are hidden to a client computer user.

14 Claims, 9 Drawing Sheets

METHOD AND APPARATUS FOR EXECUTING DISTRIBUTED OBJECTS OVER A NETWORK

BACKGROUND OF THE INVENTION

The present invention relates generally to communications between networked computing devices and, more particularly, to a method and apparatus for remotely executing objects distributed over a network using interprocess communications that are protocol-independent and hidden to a user.

With the increasing popularity of the Internet, computer manufacturers and software developers continue to seek ways to improve how people and machines communicate with one another over a network. Certainly, as part of this effort, computer manufacturers and software developers are constantly searching for ways to increase communication speeds between computing devices connected to a network. In fact, modem speeds have increased exponentially over the past decade and continue to do so. Although hardware development is growing at a fast pace to improve network communications, software solutions also play a role in improving the overall efficiency and accuracy of information transferred over a network (e.g., the Internet). To provide a clearer understanding of how current networked devices communicate, a description of the basic Internet architecture is provided below.

A network is two or more computers connected together to allow users to communicate and share resources (e.g., databases). The Internet is essentially a wide area network (WAN) that connects a plurality of local area networks (LANs) and allows users worldwide to communicate with each other over telephone lines or other communication channels. Computers communicate over the Internet using server programs (servers) or client programs (clients). Servers are programs that provide resources while clients are programs that utilize the provided resources. Typically, Internet Service Providers (ISPs) use server computers and ISP subscribers use client computers. For example, a mail client program sends and receives messages over the Internet and allows a user to view the mail messages. A mail server program maintains an electronic mailbox that delivers mail to the mail client program.

The Internet supports the World Wide Web (WWW), which comprises many web server computers that provide information to client computers in the form of pages (i.e., web pages). To access a web page, a web client program (e.g., a browser such as Netscape Navigator) calls the appropriate web server computer to retrieve and display the web page to a user. The web client program may also call upon an auxiliary program (e.g., an applet) to, for example, display a picture, play a sound, or perform login functions. These type of programs are typically constructed using the Java™ computer language and programming environment available from Sun Microsystems, Inc. of Mountain View, Calif. Sun, Sun Microsystems, and Java are trademarks or registered trademarks of Sun Microsystems, Inc. in the United States and other countries.

While running on the client computer, an application process can communicate with another application process running on the server computer to obtain information or retrieve an applet. This interprocess communication is typically supported by the transmission control protocol and Internet protocol (TCP/IP). TCP controls the manner in which data is transferred between computers and other devices connected to the Internet while IP transmits the data. Interprocess communication protocols (e.g., TCP/IP sockets, remote method invocation (RMI), and common object request broker architecture (CORBA)) serve as an interface between the running client application process and the server application process in order to provide a smooth transfer of information between the two network devices. However, clients and servers are typically configured to work with only one interprocess communication protocol and are often not platform-independent.

When developing an application to run on the client side, a programmer typically writes and compiles the application, and then stores it in a memory of the client computer for later execution. Storing the application on the client computer allows for quick access and execution when run by the user. Nevertheless, certain applications may require a significant amount of memory in the client computer, thereby limiting the available storage capacity for other resident applications.

In many instances, the client computer can download the application from another computer connected to the network instead of storing the application in memory. For example, the client computer may request an applet from a server computer to generate animated pictures on a webpage. In this instance, the server computer transfers a copy of the applet code over the network for execution by the client computer. Although the client computer can download applets from virtually any computer connected to the network, the time it takes to transfer the entire applet can be significant. In addition, some applets can be fairly large (e.g., 10 MB) thus, adversely affecting the flow of traffic over the network, especially when large numbers of applets are transferred at the same time.

Therefore, current solutions for developing and transferring applications over a network can be improved to provide a more efficient use of network resources without burdening the flow of network traffic.

SUMMARY OF THE INVENTION

Based on the foregoing shortcomings, it is desirable to improve the way software applications are developed, distributed, and executed on one or more computers connected to a network without compromising computer memory limitations and network traffic flow. In addition, it is desirable to provide a framework to develop N-tier client/server applications which hide the underlying interprocess communications and are platform-independent. These features make the applications suitable for Internet-wide applications.

Once an application is developed and compiled, it is also desirable to distribute one or more components of the application to other computers connected to the network such that the distributed nature of the application is completely hidden to the programmer and user. This feature facilitates parallel processing thereby reducing storage and processing burdens on the computer running the application. In addition, storing application components in different locations over the network reduces the number of requests for the application made to any one computer. For example, a computer storing all of the application components may receive 100 requests to download copies of the application. However, if components of the application are stored on two computers connected to the network, the requests to any one computer could be reduced by half.

It is further desirable to provide a simple method for developing applications and distributing application components to remote computers (e.g., server computers) connected to the network. Such a method provides good load balancing of the application components over the network and facilitates distribution of application components based on the processing capabilities of the remote computers.

The foregoing desires are realized by developing an application using object oriented code. This type of code permits a programmer to develop an application using objects which are self-contained application components that work together. Once developed and compiled, the programmer can distribute application objects locally or remotely over a network. The address location and name of each object of the application, whether local or remote, is retained in the local computer application. Thus, while running on the local computer, the application process can request an application object from a local or remote network location using the address of the object, the name of the object, and any input values. If the requested object is not on the local computer, the computer on which the requested object resides receives the name of the object, executes the object using the input values, generates an output value of the object, and sends the output value to the requesting computer. The output value is then used in the running application. Although object execution is remote, the user of the requesting computer is given no indication of this remote operation.

As an example, a programmer wishes to develop an application that determines whether a customer can access certain account files on-line. Upon receiving the request to access the account files, the application reviews the customer's name and personal identification number (PIN), checks this information against current records, and then generates an "access granted" or "access denied" response to the request. Initially, the programmer develops the application using an object-oriented code language so that the application can include distinct and separable objects. Once the application is developed and compiled, the programmer can then distribute an object of the application to a remote server computer while retaining an address for the distributed object. The distributed object performs the task of checking the customer's name and PIN against current records. Subsequently, a client computer receives a customer access request and executes the application. While running, the application process sends a request to the remote server computer including the address and name of the object and well as the customer's name and PIN as input values. The remote server executes the object using the input values, generates an output value, "access denied," and sends the output value to the client computer. The running application then generates an "access denied" response to the requesting customer.

Methods and apparatus consistent with the present invention provide the foregoing operation. Specifically, a method for executing a distributed object of a program over a network of computers comprises the steps of distributing an object of a compiled program to a remote computer connected to a local computer over a network; running the program on the local computer; sending a request for the object from the local computer to the remote computer; executing the object on the remote computer to produce an output value; and routing the output value to the local computer over the network for use in the running program.

A data processing system comprises a first computer for developing a program with a plurality of objects, the first computer having a memory configured to store the program, a compiler configured to compile the program, a communications device configured to distribute an object of the program to a remote location, and a processor configured to run the program; and a second computer in communication with the first computer over a network, the second computer having a memory configured to store an object of the program distributed to the second computer over the network, a processor configured to execute an instance of the object when requested by the first computer to generate an output value, and a communications device configured to send the output value to the first computer over the network for use in the running program.

Additional desires, features and advantages of the invention are set forth in the following description, apparent from the description, or may be learned by practicing the invention.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate embodiments of the invention and, together with the preceding general description and the following detailed description, explain the principles of the invention.

In the drawings.

DETAILED DESCRIPTION

Reference will now be made in detail to the construction and operation of an exemplary embodiment consistent with the present invention that is illustrated in the accompanying drawings. In those drawings, like elements and operations are designated with the same reference numbers.

The exemplary embodiment allows a programmer to develop an application having objects that can be distributed and executed over a network without compromising computer memory limitations and network traffic flow. In addition, the application is platform-independent so that it is reusable in a variety of network environments without the necessity of changing code. The exemplary embodiment provides these advantages by remotely executing an application object over a network without having to transfer object code as shown by the method of FIG. 1.

Figure 1:
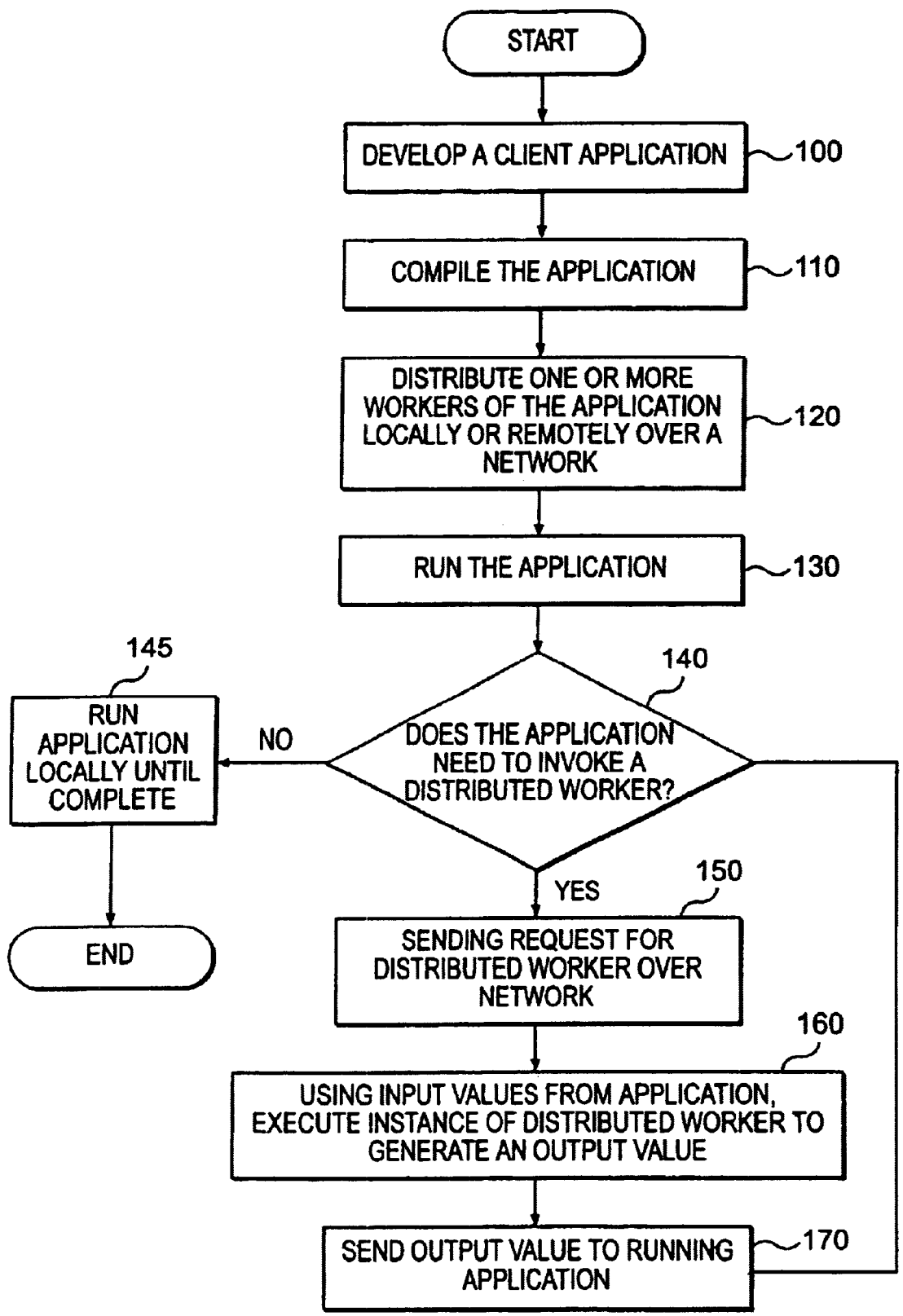
FIG. 1 illustrates a method for developing, distributing, and remotely executing distributed objects over a network consistent with the present invention.

FIG. 1 illustrates a method for developing, distributing, and remotely executing distributed objects over a network. Initially, a programmer develops a client application using a specific programming language (step 100). Any object-oriented programming language may be used to develop the client application. In describing the exemplary embodiment, however, reference is made to the Java programming language for its object-oriented code design and versatility for Internet applications. One skilled in the art will appreciate that reference to the Java programming language and other Sun Microsystems products is not intended to limit the exemplary embodiment to these elements.

Applications written in the Java programming language include "classes" which are building blocks or objects of the application. A class can contain methods, variables, initialization code, and even other classes. In addition, each class can provide a function of the application that executes an instance of the class. Class "instances" are run-time objects that implement the class structure. Further details about the Java programming language can be found in Niemeyer and Peck, *Exploring Java,* Second Edition, O'Reilly & Associates, Inc. (1997).

The programmer develops the application using "workers" which are defined as classes in the Java programming language that have the capability of executing a specific task, upon request, through a particular method. The worker can receive an input value, process the input value, and generate an output value. The programmer first creates a worker to do a specific task and then uses the worker directly in the client application. The worker has the capability to run locally or remotely; however, where it will run is not an overriding concern during the development stages of the application.

Once fully developed, the programmer compiles the application (step 110), and allocates and distributes workers of the application to a server computer over a network (e.g., Internet) (step 120). Alternatively, an application may be developed and compiled on another computer and loaded onto the client computer before the workers are distributed. The address of the server computer on which a worker is distributed is retained in the application on the client side so that the worker can be located when needed. Alternatively, a default server computer or collection of server computers may be defined for a client computer which alleviates the need to retain the worker address. In this instance, the client computer first searches locally for a worker and then searches the default server computer or collection of server computers until the worker is located. If the default server address of the worker resides in the application, the client computer does not search locally, but attempts to directly locate the worker on the default server. As a further alternative, the distribution of workers can be decided on the performance basis once the application is complete or during execution of the application process. In either instance, the user of the client computer is unaware that objects of the application (i.e., workers) are remotely located.

When a user runs the completed application on the client computer (step 130), the application may invoke a distributed worker to perform a required function (e.g., compute a number) (step 140). If the application does not invoke a distributed worker, it will run locally until complete (step 145). If the application invokes a distributed worker, the address and name of the worker along with input values from the application are sent over the network to the server computer (step 150). Using the input values, the server computer executes an instance of the worker to generate an output value (step 160) and sends the output value to the running client application (step 170). This routine may be repeated as necessary to invoke the same worker or additional distributed workers.

Figure 2:
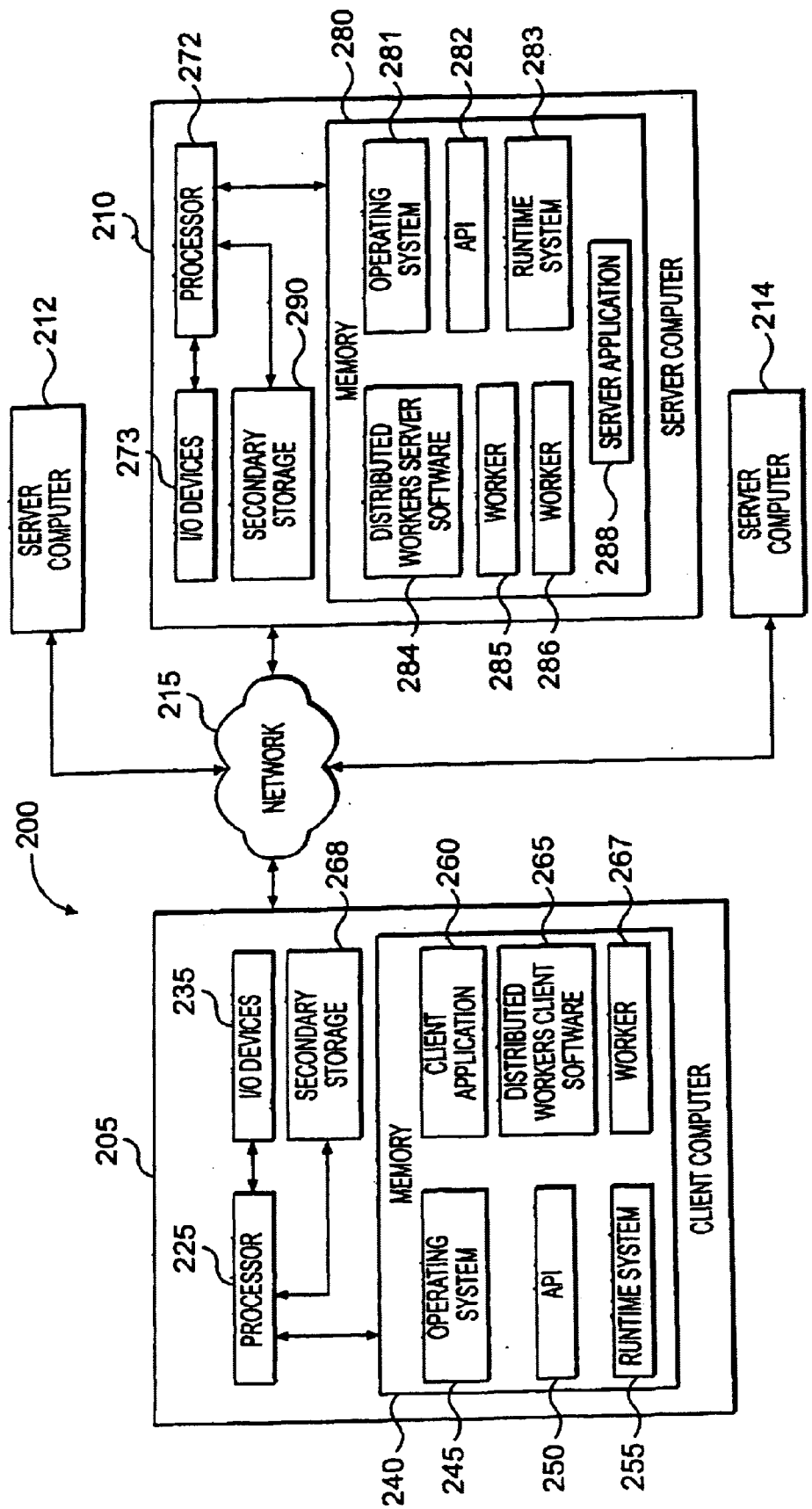
FIG. 2 illustrates a data processing system supporting the remote execution of distributed objects consistent with the present invention.

FIG. 2 illustrates a data processing system 200 supporting the remote execution of distributed workers consistent with the present invention. Data processing system 200 includes a client computer 205 connected to a plurality of server computers 210, 212, and 214 via a network 215, such as the Internet. Although data processing system 200 depicts only four computers, one skilled in the art will appreciate that the system may support a large number of additional computers. In fact, the remote execution of distributed workers consistent with the present invention may take place in virtually any computer connected to the network. Consequently, the elements and operation of embodiments consistent with the present invention as described herein may be duplicated in other network computers as appropriate.

Client computer 205 allows a user to access network 215 resources (e.g., other computers not shown in FIG. 2). To accomplish this function, client computer 205 includes processor 225, input/output devices 235, memory 240 and secondary storage device 268. Although these components provide the functionality for implementing embodiments consistent with the present invention, other components may be used in client computer 205 that are not shown in FIG. 1 or described herein.

Processor 225 is a processor, such as a Pentium processor available from Intel Corporation of Santa Clara, Calif., capable of processing complex applications. Input/output devices 235 can include a keyboard, mouse, touch-screen, disk drives, or microphone to allow a user to input information into client computer 205. In addition, input/output devices 235 can include a display, printer, or speaker to provide visual or audio output, respectively, to a user. Memory 240 can be random access memory (RAM) with high-speed access capabilities (e.g., CD-ROM, floppy disk, optical disk drive, etc.) that communicates with processor 225 to store and retrieve data during processing operations.

As illustrated in FIG. 2, an operating system 245, a Java application programming interface (API) 250, a Java runtime system 255, a client application 260, a distributed workers client software 265, and a worker 267 all reside in memory 240.

Operating system 245 is capable of supporting window-based applications (e.g., Solaris, Linux, Windows95/NT, MacOS, OS/2, etc.). Solaris is a trademark or registered trademark of Sun Microsystems, Inc. in the United States and other countries. Java API 250 is a programming interface that allows a user to develop client applications in Java code. This interface includes predefined software programs with numerous platform-independent objects that can be implemented on operating system 245 (e.g., Solaris). A more detailed description of the Java API may be found in Jaworski, *JAVA* 1.1 *Developer's Guide,* Second Edition, Sams.net Publishing (1997). Applications developed using Java API 250 are compiled on a Java compiler to create byte codes. Java runtime system 255 interprets and executes byte codes. Java runtime system 255 includes a Java virtual machine plus additional software, such as class libraries, which are used to implement Java API 250 on client computer 205. The Java virtual machine is an abstract computing machine that includes an instruction set for implementing the Java programming language and is more clearly described in Lindholm and Yellin, *The Java Virtual Machine Specification,* Addison-Wesley (1997).

Client application 260 is a network-based software application (e.g., browser software) configured to operate on client computer 205. Client application 260 is developed using the Java programming language and supports distributed workers.

Distributed workers client software 265 comprises program methods used to execute workers locally or remotely over network 215. Client application 260 uses these distributed workers as necessary during execution. Distributed workers client software 265 is developed using the Java programming language and, thus, runs on Java runtime system 255. The components and operation of distributed workers client software 265 are described in detail below with regard to FIG. 3.

Although software applications used in embodiments consistent with the present invention are described as being contained in memory 240 of client computer 205, one skilled in the art will appreciate that these software applications may be contained in other forms of computer readable media, such as a secondary storage device 268 (e.g., hard disks, floppy disks, CD-ROM, etc.), a carrier wave from network 215 (not shown), or other forms of RAM or ROM.

Server computers 210, 212, and 214 are computing devices capable of communicating with client computer 205 over network 215. For simplicity, only server computer 210 is described below. Nevertheless, server computers 212 and 214 may operate, and include hardware and software components, similar to that of server computer 210. For example, these server computers may be operated by an ISP to provide resources and information accessible to a client computer over network 215. To facilitate this operation, server computer 210 includes a processor 272, input/output devices 273, a memory 280, and a secondary storage device 290. As with client computer 205, only essential components of server computer 210 are illustrated in FIG. 2 or described herein. One skilled in the art will appreciate that other components may be included in server computer 210 such as additional processors and optical disk drives. In addition, server computer 210 can operate as a client computer and request information and execution assistance from other computing devices and databases connected to network 215.

Processor 272 is a processor, such as a Pentium processor, capable of processing complex applications. Input/output devices 273 can include a keyboard, mouse, touch-screen, disk drives, or microphone to allow a user to input information into server computer 210. In addition, input/output devices 273 can include a display, printer, or speaker to provide visual or audio output, respectively, to a user. Input/output devices 273 allow information to be stored, retrieved, or otherwise manipulated by a local server computer operator (e.g., ISP).

Memory 280 can be RAM with high-speed capabilities (e.g., CD-ROM, floppy disk, optical disk drive, etc.). Memory 280 stores programs executed by processor 272 and information accessible by client computer 205, such as web page information. Stored in memory 280 is an operating system 281, a Java API 282, a Java runtime system 283, distributed workers server software 284, workers 285 and 286, and server application 288.

Operating system 281 runs on processor 272 and is capable of supporting window-based applications. Network-based applications executed on server computer 210 are developed using Java API 282. Java API 282 is a programming interface that allows a user to develop server applications in Java code. This interface includes predefined software programs with numerous platform-independent components that can be implemented on operating system 281. Applications developed using Java API 282 are compiled on a Java compiler to create byte codes.

Java runtime system 283 interprets and executes byte codes using the capabilities of server computer 210. Java runtime system 283 consists of a virtual machine plus additional software, such as class libraries, that are used to implement Java API 282 on server computer 210.

Distributed workers server software 284 comprises program methods used to process distributed worker requests made by client computer 205. This processing includes finding the distributed worker in a memory of the server location or of a remote location, retrieving the distributed worker from memory, executing the distributed worker to produce an output value based on the request, and sending the output value over network 215 to client computer 205. Distributed workers server software 284 is developed using the Java programming language to facilitate distributed worker processing. The components of distributed workers server software 284 are described in detail below with regard to FIG. 5.

Worker 285 and 286 comprise objects of client application 260 or applications stored in memory 280. These workers can be developed using Java API 282 and run on Java runtime system 283. The manner in which workers are stored and executed is provided in detail below with respect to FIGS. 3–7.

Server application 288 is an application process that runs on server computer 210 to implement one or more server functions (e.g., providing server resources to client computers). For example, server application 288 may implement website functionality, manage e-mail accounts, or support hyperlinks to other server computers connected to network 215 (e.g., server 212).

Although software applications used in embodiments consistent with the present invention are described as being contained in memory 280 of server computer 210, one skilled in the art will appreciate that these software applications may be contained in other forms of computer readable media, such as a secondary storage device 290 (e.g., hard disks, floppy disks, CD-ROM, etc.), a carrier wave from network 215 (not shown), or other forms of RAM or ROM.

Network 215 is a wide area network, such as the Internet, over which a plurality of computers communicate using a standard communications protocol (e.g., TCP/IP). However, network 215 can be a local area network that supports the transfer of information and code between two or more computers.

Figure 3:
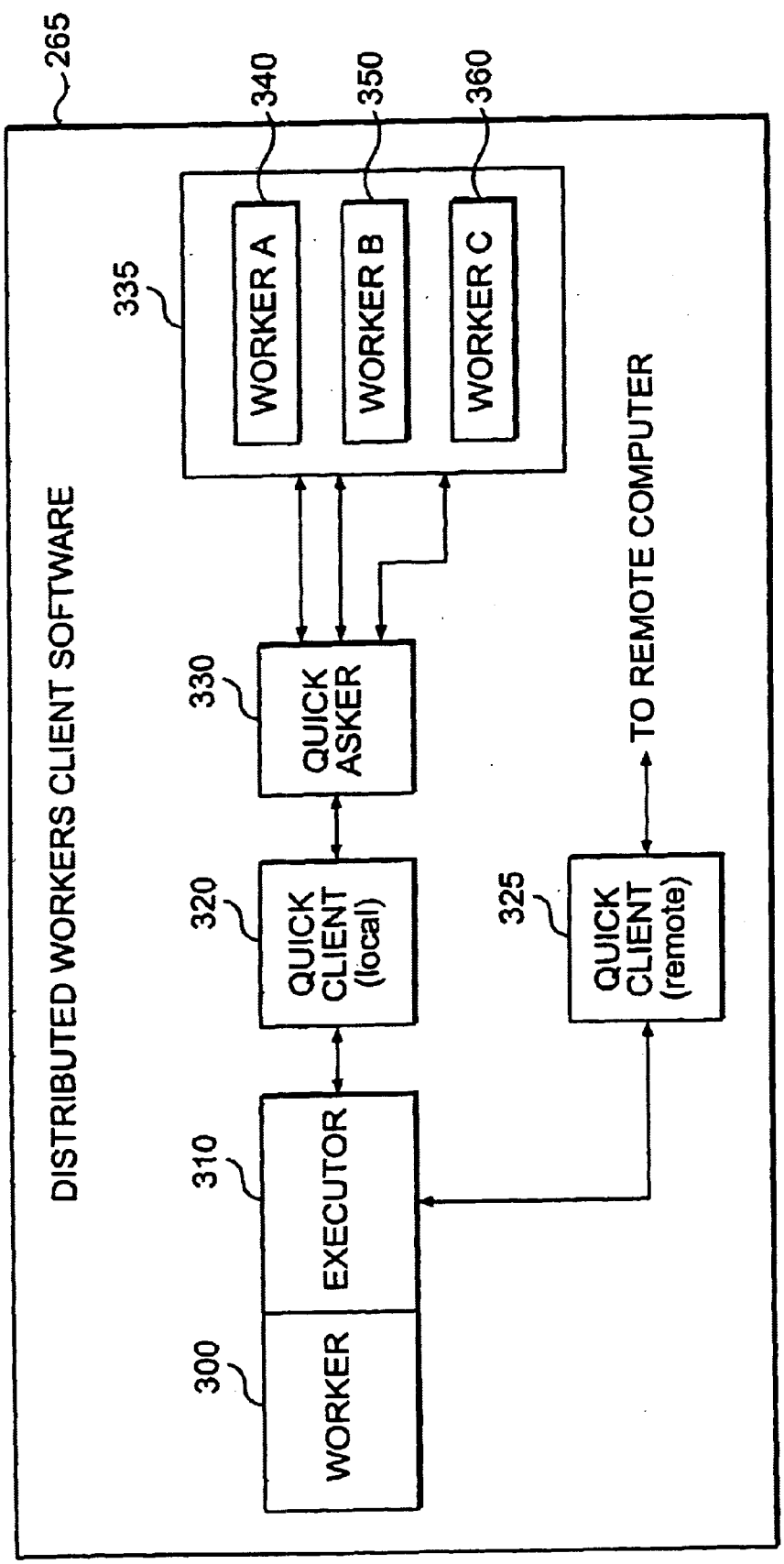
FIG. 3 illustrates components of client software for requesting and executing distributed objects consistent with the present invention.
Figure 4:
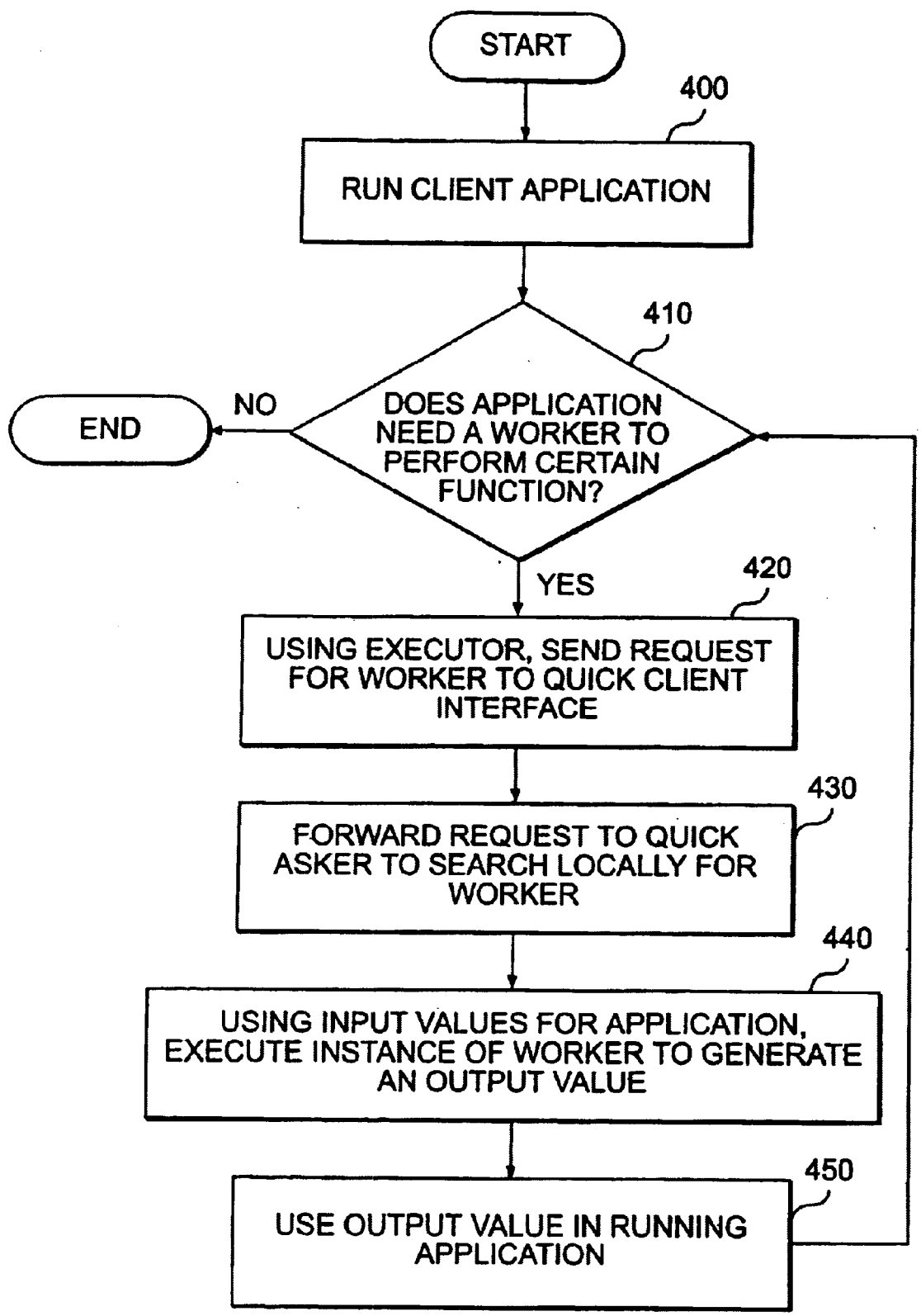
FIG. 4 illustrates a client software method for requesting and executing distributed objects consistent with the present invention.

FIG. 3 illustrates the components of distributed workers client software 265 executed in client computer 205 consistent with the present invention. Distributed workers client software 265 is object-oriented code written in the Java programming language that allows workers to be distributed and remotely executed. In addition, distributed workers client software 265 allows for interprocess communications with computers connected over network 215 which are transparent to the user of client computer 205. However, local workers can also be executed using distributed workers client software 265 when client computer 205 is not connected to network 215. FIG. 4 illustrates a method for implementing this particular local distributed worker feature of the present invention.

As shown in FIG. 3, distributed workers client software 265 includes a client application worker 300, executor class 310, quick client class 320, quick asker class 330, and a plurality of local workers 335: Worker A 340, Worker B 350, and Worker C 360. Client application worker 300 runs the execute method of one or more workers 335 stored within client computer 205. Client application worker 300 can also execute methods of workers stored at a remote location (e.g., server computer 210). The execute method of a worker is the process steps implemented by the worker to perform a specified function. For example, a worker developed to compute the number of users having access to a particular account performs one or more computations to determine the number.

Client application worker 300 includes an executor program 310 that determines the location of a requested worker (i.e., client side or server side). This determination is made using quick client class 320 which operates as an interface between executor class 310 and local workers 335. A quick client class is an interface for each local and external communication link. That is, a separate quick client class is used to locate local workers (e.g., quick client class 320) and remote workers (e.g., quick client class 325). The quick client class used by executor 310 depends on whether the worker is stored on a remote computer as indicated by its address.

FIG. 4 illustrates a method implemented by distributed workers client software 265 consistent with the present invention. This method, as illustrated in FIG. 4, may be implemented completely on client computer 205. Therefore, client computer 205 may be disconnected from network 215 when implementing the following method. Initially, client computer 205 runs client application 260 (step 400). The running client application then determines whether it needs to invoke a worker to implement a certain application function (step 410). If not, the client application runs until it is completed. If so, executor program 310 sends a worker request to the local quick client class 320 (step 420). As a local worker interface, the local quick client class sends a request to quick asker class 330 for the desired worker (step 430). The name and address of the worker as well as input values from the client application are included in the request. Using the worker name, quick asker class 330 determines whether the requested worker (e.g., Worker A 340, Worker B 350, and Worker C 360) is resident on client computer 205. If so, quick asker class 330 invokes the worker method on client computer 205 using the input values to generate an output value (step 440). The output value is then used in the running client application (step 450). If the requested worker is not resident on client computer 205, remote quick client class 325 is implemented to locate and invoke the requested worker on a remote computer as described with reference to FIGS. 5–9.

Figure 5:
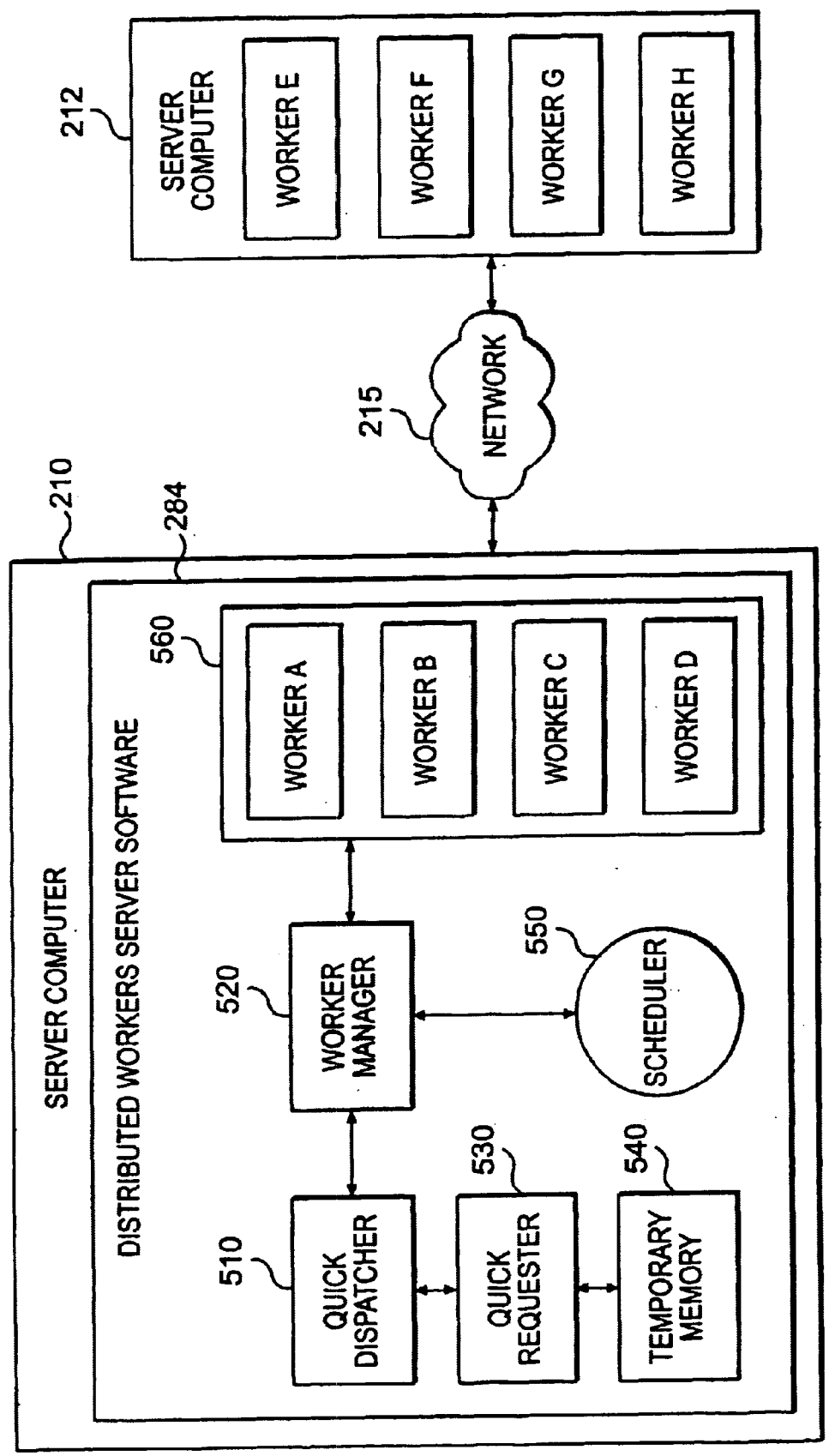
FIG. 5 illustrates components of server software for responding to distributed object requests consistent with the present invention.

FIG. 5 illustrates components of distributed workers server software 284 which include a quick dispatcher class 510, worker manager class 520, quick requester class 530, temporary memory storage 540, and a scheduler class 550. One or more workers 560 can be stored in a memory of server computer 210. In addition, server computer 210 can access requested workers stored in server computer 212 via network 215. Therefore, when requested by a running client application process, the workers can be located and executed appropriately. A description and method of implementing distributed workers server software 284 is described in detail below.

Figure 6:
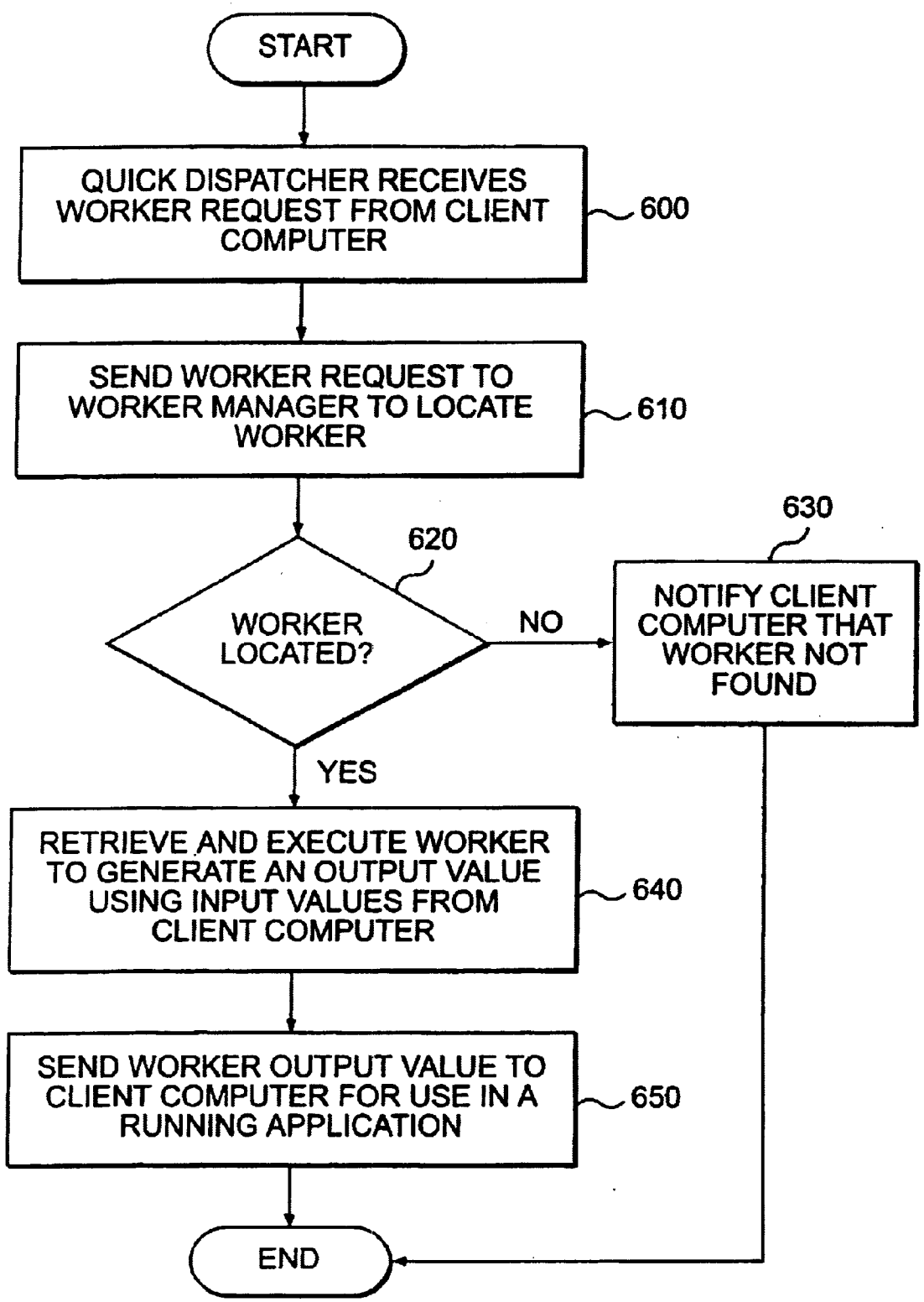
FIG. 6 illustrates a server software method for responding to distributed object requests consistent with the present invention.

FIG. 6 illustrates a distributed workers server software 284 method consistent with the present invention. First, quick dispatcher class 510 receives a worker request from client computer 205 over network 215 (step 600). Quick dispatcher class 510 unpacks the request, including the worker name and any input values. Using the worker name, quick dispatcher class 510 sends a search request to worker manager class 520 (step 610). Worker manager class 520 creates a thread to implement worker processing. A thread is a single sequential flow of control within a program. Worker manager class 520 is capable of creating multiple threads which can run simultaneously. Processing times for each thread are controlled by scheduler 550 which is included in the operating system of server computer 210.

Worker manager program 520 attempts to locate the requested worker in a memory of server computer 210 (step 620). If the requested worker is not located, quick requester 530 notifies client computer 205 (e.g., via a message) that the worker is not found (step 630). If it is found, worker manager class 520 retrieves the requested worker from a memory of server computer 210 (step 640). Worker manager class 520 allows workers to be loaded and unloaded while server computer 210 is running. That is, the loading and unloading process takes place immediately without the need for recompiling the worker. In addition, worker manager class 520 can be programmed to restrict remote access to a worker (e.g., honoring worker requests from only specified client computers).

Once the requested worker is retrieved, worker manager class 520 sends the requested worker to quick dispatcher class 510 which passes it on to quick requester class 530. Quick requester class 530 executes the requested worker (e.g., Worker A) using the input values received from client application 260 (step 640). Temporary memory 540 may be used to store data temporarily during the execution process. Upon execution, the worker generates an output value that is sent to client computer 205 by quick requester 530 for use in client application 260 which is running on client computer 205 (step 650). Sending the worker output value from server computer 210 to client computer 205 eliminates the need to send any worker code over network 215 during execution.

Figure 7:
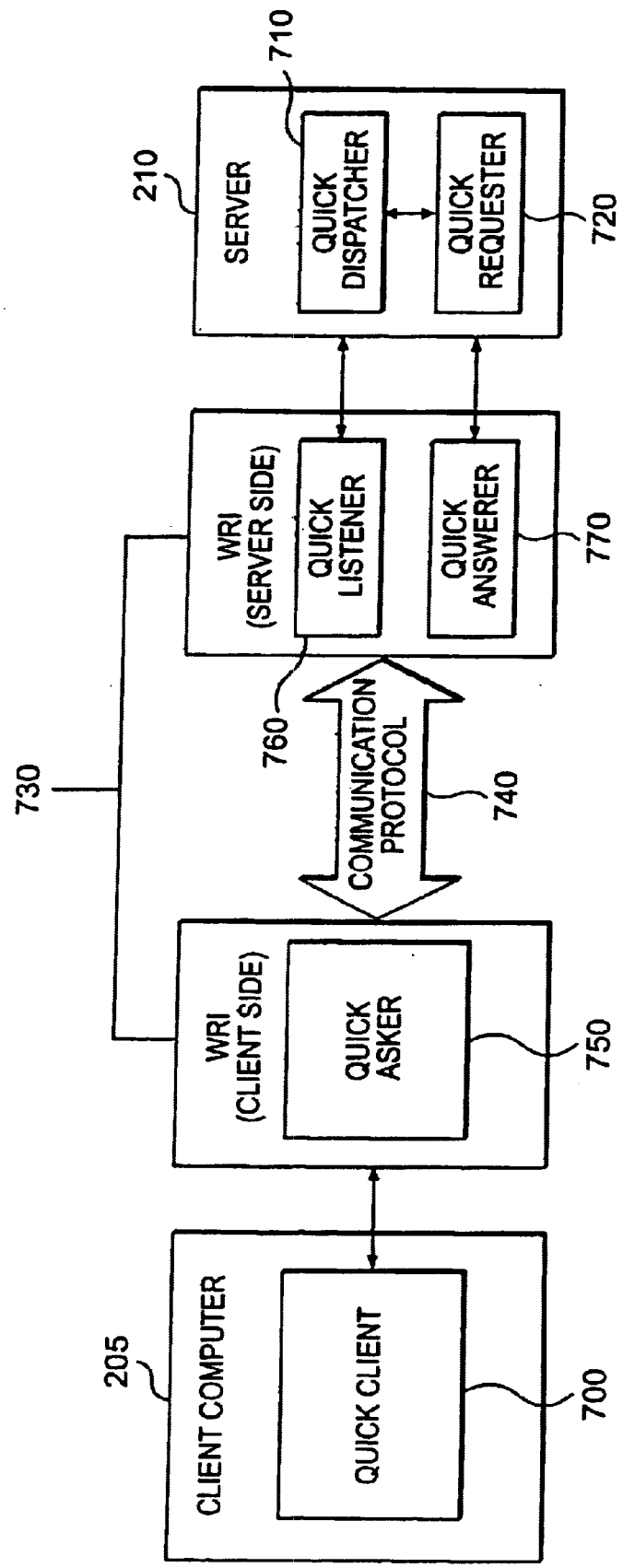
FIG. 7 illustrates an interaction between client computer, communications protocol, and server computer consistent with the present invention.

FIG. 7 illustrates the interaction between distributed workers software in client computer 205, a communications protocol 740, and distributed workers software 284 in server computer 210 consistent with the present invention. In an exemplary embodiment, quick client class 700, quick dispatcher class 710, and quick requester class 720 are designed to be independent of communication protocol 740 to offer a high degree of scalability in multi-user environments. In order for client computer 205 to send a worker request to server computer 210, however, the format of the request must be compatible with the selected communications protocol. Since quick client class 700, quick dispatcher class 710, and quick requester class 720 are designed to be communication protocol independent, a worker request interface (WRI) 730 protocol is used between these programs and a communications protocol 740 to facilitate a smooth flow of data between client computer 205 and server computer 210.

WRI 730, illustrated in FIG. 7, includes a quick asker class 750 on the client side, and quick listener 760 and quick answer 770 classes on the server side. Each of these classes is configured to work with a specific communications protocol (e.g., TCP/IP sockets, CORBA, RMI, etc.). Thus, both client computer 205 and server computer 210 can store a plurality of these classes in memory, one for each type of communications protocol whether synchronous (e.g., TCP/

IP sockets and CORBA) or asynchronous (e.g., SMTP and log files) in nature.

Quick Asker class 750 formats worker requests received from quick client class 700 into a form that is compatible with the corresponding communications protocol. Quick Listener class 760 receives and reformats the worker request so it is readable by quick dispatcher class 710 on the server side. After obtaining an output value from the executed worker, quick requester class 720 sends the output value to quick answerer class 770 which modifies this information into communications protocol format and sends it to quick asker class 750 on the client side. Quick asker class 750 then forwards the information to quick client class 700 for use in a running application process.

Figure 8:
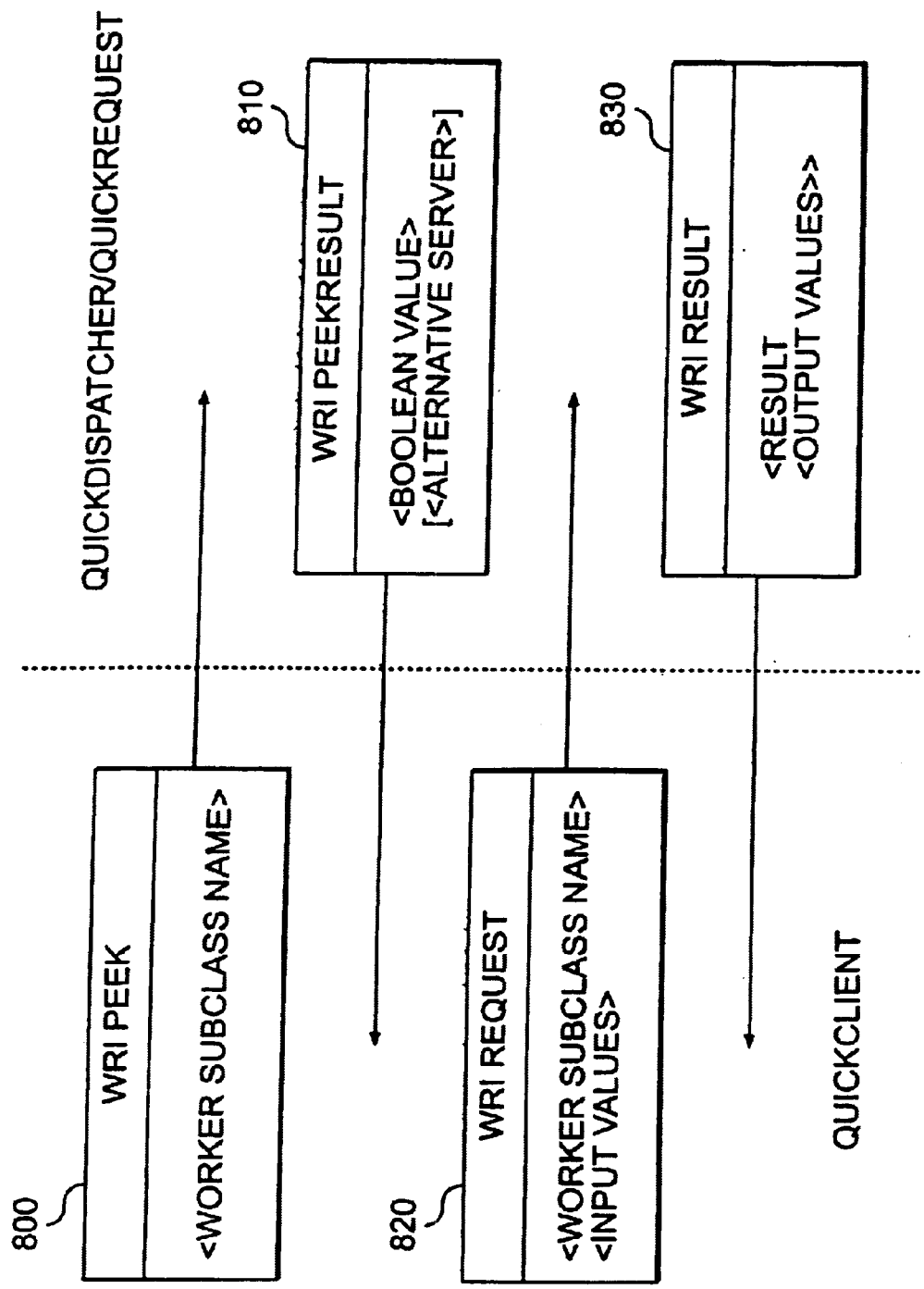
FIG. 8 illustrates message transfers between distributed object software stored in client and server computers consistent with the present invention.

WRI 730 protocol implements a small and simple set of messages, an example of which is shown in FIG. 8. In this example, quick client class 700 sends a WRI Peek message 800 through quick asker class 750, in the form of data packets, to quick listener 760. This message includes the worker name and simply attempts to locate, not execute, a worker. Quick dispatcher class 710 receives the message through quick listener class 760 and searches for the requested worker. Quick requester class 720 sends a WRI PeekResult message 810 back to quick client class 700 through quick answerer class 770. This message includes a boolean value identifying the requested worker or may include the address of an alternative server where the requested worker can be found. Quick client class 700 can also send a WRI Request message 820 which includes a worker name and client application input values. This message follows the same path as WRI Peek message 800 to quick dispatcher class 710. In response to this message, quick dispatcher class 710 locates the requested worker and quick requester class 720 executes the worker to yield an output value. Subsequently, quick requester class 720 sends a WRI Result message 830 to quick client class 700 through quick answerer class 770 and quick asker class 750. WRI Result message 830 includes the result of the worker request and associated output values.

Figure 9:
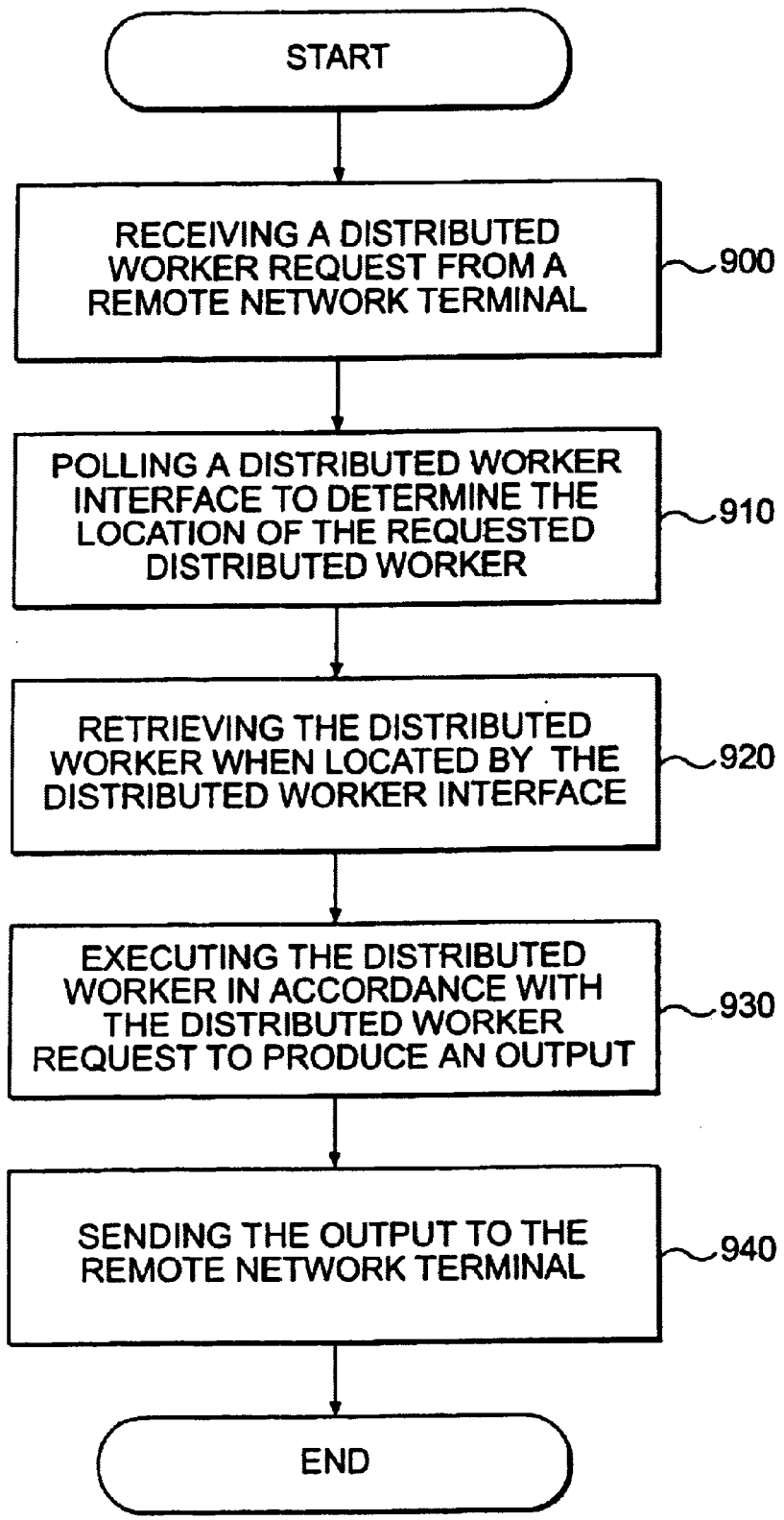
FIG. 9 illustrates a method for remotely processing a distributed object request consistent with the present invention.

FIG. 9 illustrates a method for processing a distributed worker request between a plurality of remote terminals connected to a network consistent with the present invention.

The method begins with receiving a distributed worker request from a remote network terminal, such as client computer 205 (step 900). A distributed worker interface is polled to determine the location of the requested distributed worker (step 910). Subsequently, the located distributed worker is retrieved from its stored location (step 920) and executed in accordance with the distributed worker request to produce an output value (step 930). Finally, the output value of the executed distributed worker is transferred to the remote network terminal (step 940). The foregoing method is implemented in Java program code. An example of such a program is as follows:

```
(1) Worker Program Code:
package workers.sql;
import quick.*;          //Quick Server specific basic classes (i.e., Worker)
import util.*;           //All purpose basic classes (i.e., ValueSet)
public class CxDoDcx extends Worker {
/**
* Overrides the execute method of the Worker class and does the actual task of this
* worker.
*/
public int execute(ValueSet vi) {
  int ret = FAIL;
  Worker w;
  w = new Worker("workers.sql.Connect");      //creates a Worker that
                                              //establishes a database
                                              //connection.
  If(w.execute(vi)==OK) {                     //execute the sql.Connect
                                              //Worker assuming that the
                                              //data to initiate the connection
                                              //is passed as input arguments
    w = new Worker("workers.sql.Do");         //creates a Worker that
                                              //performs a SQL request
    if(w.execute(vi)==OK) {                   //execute the sql.Do Worker
                                              //assuming that the SQL
                                              //statement was included in the
                                              //input arguments
      setValuesOut(w.getValuesOut());         //if the SQL statement
      //included, set the output
      //values of the sql.Do using
                                              //its own output values
    }
    w = new Worker("workers.sql.Disconnect"); //create a Worker to close the
                                              //database connection
    if(w.execute(vi)==OK) {                   //close the database connection
                                              //set the results value to OK.
      ret = OK;
    }
  }
  return ret;
}
}
(2) Client Application that calls a Worker Program:
import quick.*;          //Quick Server specific basic classes (i.e., Worker)
```

-continued

```
import util.*;              //All purpose basic classes (i.e., ValueSet)
public class Client Application {
static public void main(String args[]) {
  InitClient.setupSocket("ra",2500);        //Initialize the Client with a
                                            //Quick Server port
  Worker w;                                 //creates a CxDoDcx Worker
  w = new Worker("workers.sql.CxDoDcx")
  ValueSet vi = new ValueSet();             //setup of input arguments
  vi.put("user, "foo_user");
  vi.put("password", "foo_password");
  vi.put("database", "foo_database");
  vi.put("dbtype", "foo_database_manufacturer");
  vi.put("sql", "select * from foo_table");
  int ret = w.execute(vi);                  //executes the CxDoDcx
                                            //Worker. If the CxDoDcx is
                                            //available locally, it will run
                                            //locally. If not, it will run in
                                            //the Quick Server bound in the
                                            //host "ra" in port 2500
  if(ret==Worker.OK) {                      //prints the results of OK
    System.out.println(w.getValuesOut().get("sql_result"));
  }
  else {
    System.out.println ("Error");           //prints SQL error message
    System.out.println(w.getValuesOut("sql_error"));
  }
 }
}
```

Embodiments consistent with the present invention reduce or eliminate the necessity to transfer distributed worker code over a network, such as the Internet, while providing a faster and simpler way for using workers in client applications. In addition, the distributed workers software for both the client and server computer is platform-independent and can be used with a plurality of interprocess communication protocols. This allows a client application to access and execute distributed workers at a remote location in a manner that is hidden to the client computer programmer and user.

While there has been illustrated and described embodiments and methods of the present invention, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A method for executing a distributed object of a program over a network of computers, comprising the steps of:
   distributing an object of a compiled program from a local computer to a remote computer connected to the local computer over a network;
   running the program on the local computer;
   sending a request for the object from the local computer to the remote computer;
   providing a response from the remote computer to the local computer identifying the location of the object;
   sending a second request including an identifier for the object from the local computer to the remote computer;
   executing the object on the remote computer to produce an output value using input values included in the second request; and
   routing the output value to the local computer over the network for use in the running program.

2. The method of claim 1 further comprising the steps of:
   developing the program in object-oriented code;
   compiling the program; and
   saving the program on the local computer.

3. The method of claim 2 wherein the developing step includes the step of programming the program using the Java programming language.

4. The method of claim 3 wherein the programming step includes the step of creating a worker in the Java programming language to use as an object of the program.

5. The method of claim 1 wherein the sending step includes the step of executing a software interface between the running program and a searching program resident in the local computer to find the requested object on the network in a manner transparent to a user.

6. The method of claim 1 wherein the distributing step includes the step of distributing an object of the program without modifying the object.

7. A method for executing a distributed object of a program on a server computer connected to a network, comprising the steps of:
   receiving a request from a source computer for an object stored in a memory of the server computer, the object originating from a complied program on the source computer;
   searching the memory of the server computer to locate the object;
   providing a result message to the source computer including an identifier of the requested object;
   receiving a second request from the source computer including the identifier and input values;
   retrieving a copy of the object from memory;
   executing the object using the input values included in the second request to produce an output value; and
   sending the output value to the source computer for use in a running program.

8. The method of claim 7 further comprising the step of creating a thread to process the object request.

9. The method of claim 8 further comprising the step of scheduling the thread with another thread created on the server computer.

10. The method of claim 7 wherein the executing step includes the step of temporarily storing information used during the execution of the object.

11. A computer-readable medium containing instructions for controlling a data processing system to perform a method, comprising the steps of:

distributing an object of a compiled object-oriented code program from a local computer to a remote computer connected over a network;

running the program on the local computer;

determining a need to invoke the object in the running program;

sending a request for the object from the local computer to the remote computer;

providing a response identifying a location of the object from the remote computer to the local computer;

sending a second request including an identifier for the object from the local computer to the remote computer;

executing an instance of the object on the remote computer to produce an output value using input values included in the second request; and sending the output value to the local computer over the network for use in the running program.

12. The computer-readable medium of claim 11 wherein the distributing step includes the step of storing an address of the remote computer in a memory of the local computer in order to subsequently find the object.

13. The computer-readable medium of claim 11 wherein the sending step includes the step of executing a software interface between the running program and a searching program resident in the local computer to find the object on the network.

14. A data processing system, comprising:

means for distributing an object of an object-oriented code program from a first computer to a second computer connected over a network;

means for running the program on the first computer;

means for determining a need to invoke the object in the running program;

means for sending a request for the object from the first computer to the second computer;

means for providing a response identifying a location of the object from the second computer to the first computer;

means for sending a second request including an identifier for the object from the first computer to the second computer;

means for executing an instance of the object on the second computer to produce an output value using input values included in the second request; and means for sending the output value to the first computer over the network for use in the running program.

* * * * *